US012627594B2

(12) United States Patent
Mahadevan et al.

(10) Patent No.: US 12,627,594 B2
(45) Date of Patent: May 12, 2026

(54) INTELLIGENT ROUTE DISTRIBUTION TO AVOID ROUTING ASYMMETRY DURING GRACEFUL RESTART IN SOFTWARE-DEFINED NETWORKS

(71) Applicant: Cisco Technology, Inc., San Jose, CA (US)

(72) Inventors: Satish Kumar Mahadevan, San Ramon, CA (US); Balaji Sundararajan, Fremont, CA (US); Basavaraju Halappa, San Jose, CA (US); Sourav Sen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 18/643,272

(22) Filed: Apr. 23, 2024

(65) Prior Publication Data

US 2025/0330417 A1      Oct. 23, 2025

(51) Int. Cl.
*H04L 45/12* (2022.01)
*H04L 45/02* (2022.01)
*H04L 45/28* (2022.01)

(52) U.S. Cl.
CPC ............ *H04L 45/124* (2013.01); *H04L 45/04* (2013.01); *H04L 45/28* (2013.01)

(58) Field of Classification Search
CPC ....... H04L 45/124; H04L 45/04; H04L 45/28; H04L 45/22; H04L 45/247; H04L 45/58
See application file for complete search history.

(56) References Cited

U.S. PATENT DOCUMENTS

| | | | |
|---|---|---|---|
| 11,108,851 B1 * | 8/2021 | Kurmala ............. | H04L 41/0816 |
| 11,329,913 B2 | 5/2022 | Duan et al. | |
| 11,929,849 B1 | 3/2024 | Mahadevan et al. | |
| 2009/0307522 A1 * | 12/2009 | Olson ................. | G06F 11/2007 |
| | | | 714/E11.178 |
| 2015/0036508 A1 * | 2/2015 | Fedyk ................... | H04L 45/124 |
| | | | 370/238 |
| 2016/0014014 A1 * | 1/2016 | Bruno ................... | H04L 45/033 |
| | | | 370/254 |

(Continued)

OTHER PUBLICATIONS

International Search Report and Written Opinion for International Application No. PCT/US2025/025234, mailed Jul. 16, 2025, 14 Pages.

*Primary Examiner* — Benjamin M Thieu
(74) *Attorney, Agent, or Firm* — Lee & Hayes, P.C.

(57) ABSTRACT

Techniques for ensuring symmetric forwarding between disparate networks are described herein. In active/standby hub architectures, hub nodes may be configured to convert a preference order (e.g., indicating a preferred hub node), specified by an endpoint on a wide-area network (WAN)-side of a network, into a local-area network (LAN)-side-routing-metric that is distributed to datacenter router(s) on the LAN-side of the network. When an active hub node loses connection to all of the available routing controllers, the active hub may automatically manipulate the LAN-side-routing-metric to make the metric worse than the standby hub to indicate that the routes being advertised by the active hub are "stale," such that the datacenter routers prefer the standby hub, avoiding traffic asymmetry as a result of the lost connection.

20 Claims, 8 Drawing Sheets

200 ⟍

(56) References Cited

U.S. PATENT DOCUMENTS

| | | | |
|---|---|---|---|
| 2016/0119330 A1 | 4/2016 | L'Heureux | |
| 2018/0278517 A1* | 9/2018 | Narayanan | H04L 45/748 |
| 2020/0287819 A1 | 9/2020 | Theogaraj | |
| 2021/0377158 A1 | 12/2021 | Pai | |
| 2021/0399920 A1 | 12/2021 | Sundararajan | |
| 2023/0093190 A1 | 3/2023 | Ramachandran | |

* cited by examiner

100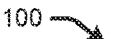

SECOND NETWORK (E.G., LAN) 104

⑤ LAN ROUTER(S) PREFER ACTIVE HUB BASED ON ROUTING METRIC

ROUTER(S) 108

HUB(S) ADVERTISE ④ ROUTES AND ROUTING METRIC

④

DISTRIBUTE WAN ROUTES AND PREFERENCE ② NUMBER TO HUB(S)

NETWORK CONTROLLER(S) 110

(1) HUB NODE (E.G., ACTIVE HUB) 106(1)

HUB NODE (E.G., STANDBY HUB) 106(N) (2)

③ HUB(S) CONVERT PREFERENCE TO ROUTING METRIC ③

PREFERENCE NUMBER 116(1)

PREFERENCE NUMBER 116(N)

(1, 2) EDGE NODE(S) 112 ① WAN ROUTES AND HUB PREFERENCE ADVERTISED TO CONTROLLER(S)

PREFERENCE ORDER 118

ENDPOINT 114(1)

ENDPOINT 114(N)

FIRST NETWORK (E.G., WAN) 102

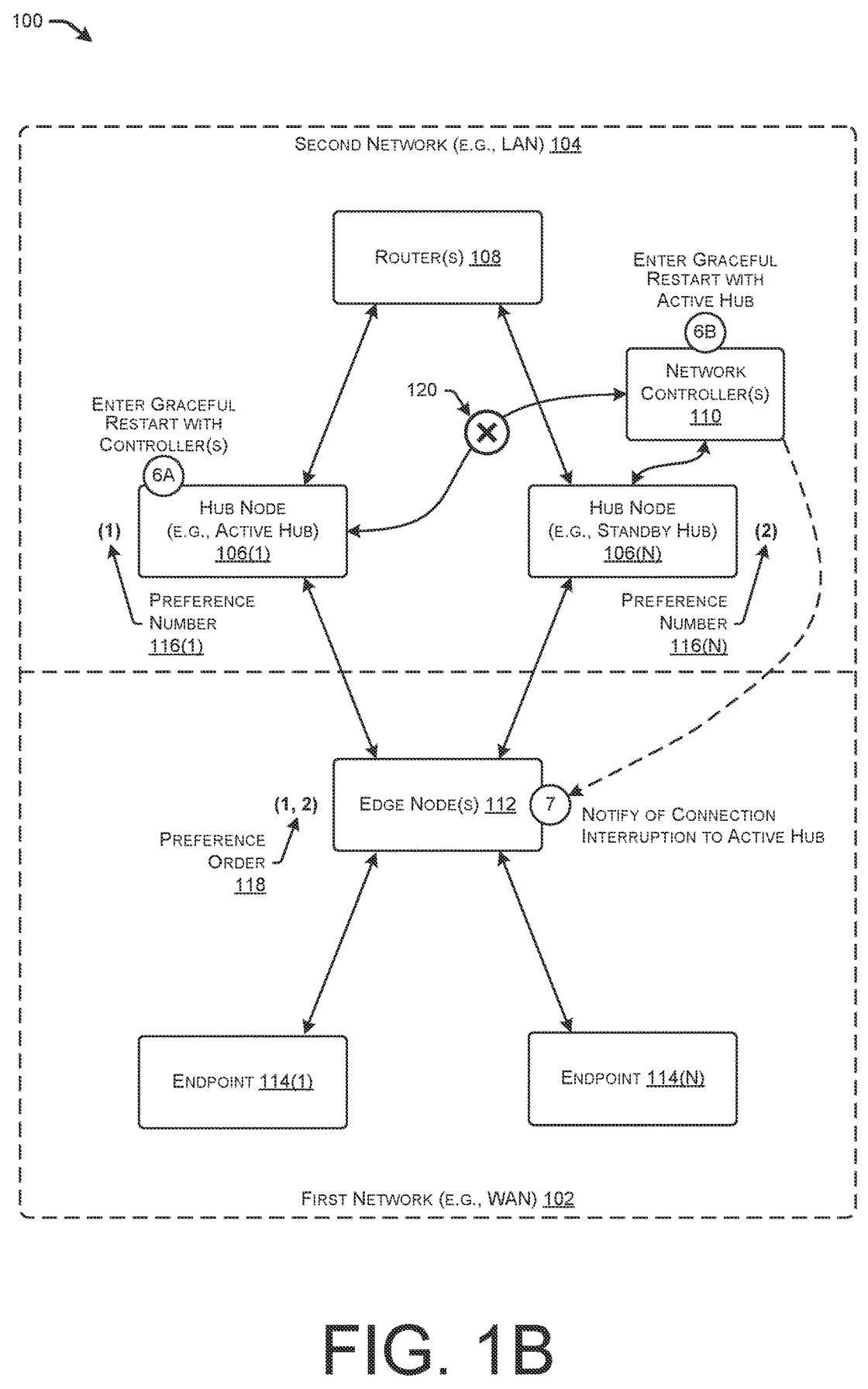

SECOND NETWORK (E.G., LAN) 104

ROUTER(S) 108

ENTER GRACEFUL
RESTART WITH
ACTIVE HUB

6B

NETWORK
CONTROLLER(S)
110

120 ⟍
⊗

ENTER GRACEFUL
RESTART WITH
CONTROLLER(S)

6A

HUB NODE
(E.G., ACTIVE HUB)
106(1)

HUB NODE
(E.G., STANDBY HUB)
106(N)

(1)

PREFERENCE
NUMBER
116(1)

(2)

PREFERENCE
NUMBER
116(N)

EDGE NODE(S) 112    7    NOTIFY OF CONNECTION
INTERRUPTION TO ACTIVE HUB (1, 2)

PREFERENCE
ORDER
118

ENDPOINT 114(1)

ENDPOINT 114(N)

FIRST NETWORK (E.G., WAN) 102

FIG. 1B

SECOND NETWORK (E.G., LAN) 104

LAN ROUTER(S) PREFER
STANDBY HUB BASED ON
ROUTING METRIC

⑪

ROUTER(S) 108

HUB(S) ADVERTISE
ROUTES AND ⑩
ROUTING METRIC

⑩

NETWORK
CONTROLLER(S)
110

120

⊗

HUB NODE
(E.G., ACTIVE HUB)
106(1)

(1)

PREFERENCE
NUMBER
116(1)

⑨ ACTIVE HUB ADJUST
ROUTING METRIC TO
INDICATE STALE
ROUTES

HUB NODE
(E.G., STANDBY HUB)
106(N)

(2)

PREFERENCE
NUMBER
116(N)

PREFERENCE ORDER
UPDATED TO PREFER ⑧
STANDBY HUB

EDGE NODE(S) 112

(2, 1)

PREFERENCE
ORDER
118

ENDPOINT 114(1)

ENDPOINT 114(N)

FIRST NETWORK (E.G., WAN) 102

FIG. 1C

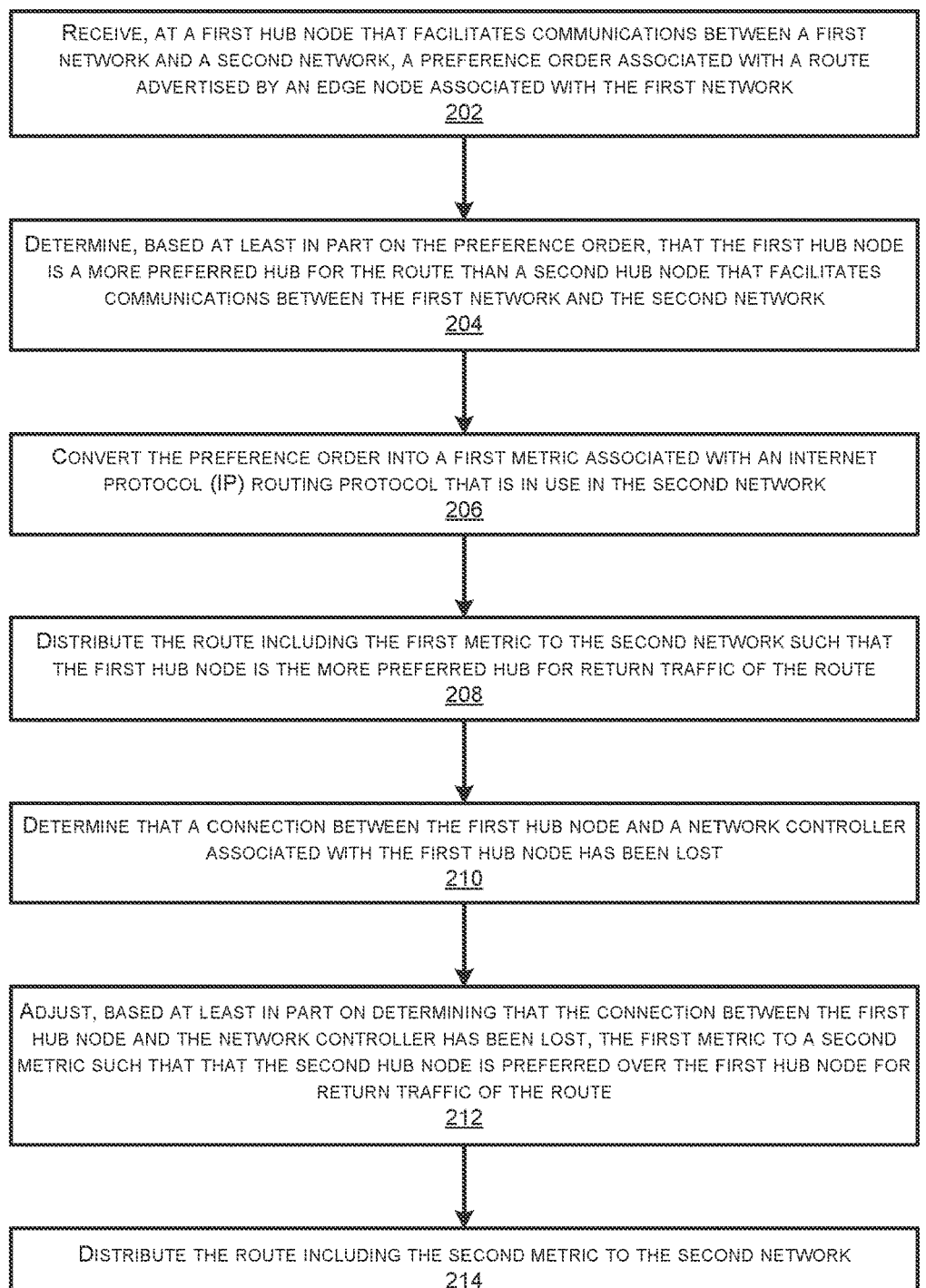

200

RECEIVE, AT A FIRST HUB NODE THAT FACILITATES COMMUNICATIONS BETWEEN A FIRST NETWORK AND A SECOND NETWORK, A PREFERENCE ORDER ASSOCIATED WITH A ROUTE ADVERTISED BY AN EDGE NODE ASSOCIATED WITH THE FIRST NETWORK
202

DETERMINE, BASED AT LEAST IN PART ON THE PREFERENCE ORDER, THAT THE FIRST HUB NODE IS A MORE PREFERRED HUB FOR THE ROUTE THAN A SECOND HUB NODE THAT FACILITATES COMMUNICATIONS BETWEEN THE FIRST NETWORK AND THE SECOND NETWORK
204

CONVERT THE PREFERENCE ORDER INTO A FIRST METRIC ASSOCIATED WITH AN INTERNET PROTOCOL (IP) ROUTING PROTOCOL THAT IS IN USE IN THE SECOND NETWORK
206

DISTRIBUTE THE ROUTE INCLUDING THE FIRST METRIC TO THE SECOND NETWORK SUCH THAT THE FIRST HUB NODE IS THE MORE PREFERRED HUB FOR RETURN TRAFFIC OF THE ROUTE
208

DETERMINE THAT A CONNECTION BETWEEN THE FIRST HUB NODE AND A NETWORK CONTROLLER ASSOCIATED WITH THE FIRST HUB NODE HAS BEEN LOST
210

ADJUST, BASED AT LEAST IN PART ON DETERMINING THAT THE CONNECTION BETWEEN THE FIRST HUB NODE AND THE NETWORK CONTROLLER HAS BEEN LOST, THE FIRST METRIC TO A SECOND METRIC SUCH THAT THAT THE SECOND HUB NODE IS PREFERRED OVER THE FIRST HUB NODE FOR RETURN TRAFFIC OF THE ROUTE
212

DISTRIBUTE THE ROUTE INCLUDING THE SECOND METRIC TO THE SECOND NETWORK
214

FIG. 2

INTELLIGENT ROUTE DISTRIBUTION TO AVOID ROUTING ASYMMETRY DURING GRACEFUL RESTART IN SOFTWARE-DEFINED NETWORKS

TECHNICAL FIELD

The present disclosure relates generally to, among other things, techniques for resolving traffic asymmetry resulting from instable connection(s) between network devices and routing controllers.

BACKGROUND

In software-defined networks (SDNs), on-device stateful features such as Network Based Application Recognition, Security, Application Quality of Experience, and Network Address Translation require symmetric forwarding. Additionally, externally hosted services like firewalls and intrusion prevention/detection systems in the cloud, in private datacenters, or in point of presence locations can require symmetric forwarding. As such, symmetric forwarding solutions need to work in a wide variety of SDN scenarios/topologies. However, given the wide variety of use cases, the solutions that are currently utilized for symmetric forwarding have some disadvantages and may fall into an asymmetric routing pattern should a connection issue arise.

For instance, an active hub and/or a standby hub may be leveraged to facilitate communications between two separate networks, where both networks prefer the active hub over the standby hub to maintain symmetric forwarding. Network controllers may be leveraged to advertise a first network's preferred hub to a second network to allow for symmetric forwarding. However, if the active hub loses connection to the network controller, the active hub may continue to advertise routes as the preferred hub, causing return traffic to be forwarded asymmetrical to the original traffic. This creates problems when stateful services, like firewalls, are deployed on the hubs and results in significant traffic loss creating an outage in the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1A illustrates a system-architecture diagram of an example environment and flow for performing the symmetric forwarding techniques disclosed herein in an example active/standby hub architecture.

FIG. 1B illustrates another system-architecture diagram of an example environment and flow for performing the symmetric forwarding techniques disclosed herein in an example active/standby hub architecture.

FIG. 1C illustrates another system-architecture diagram of an example environment and flow for performing the symmetric forwarding techniques disclosed herein in an example active/standby hub architecture.

FIG. 2 illustrates a flow diagram of an example method for performing the symmetric forwarding techniques disclosed herein.

DESCRIPTION OF EXAMPLE EMBODIMENTS

Overview

Figure 3:
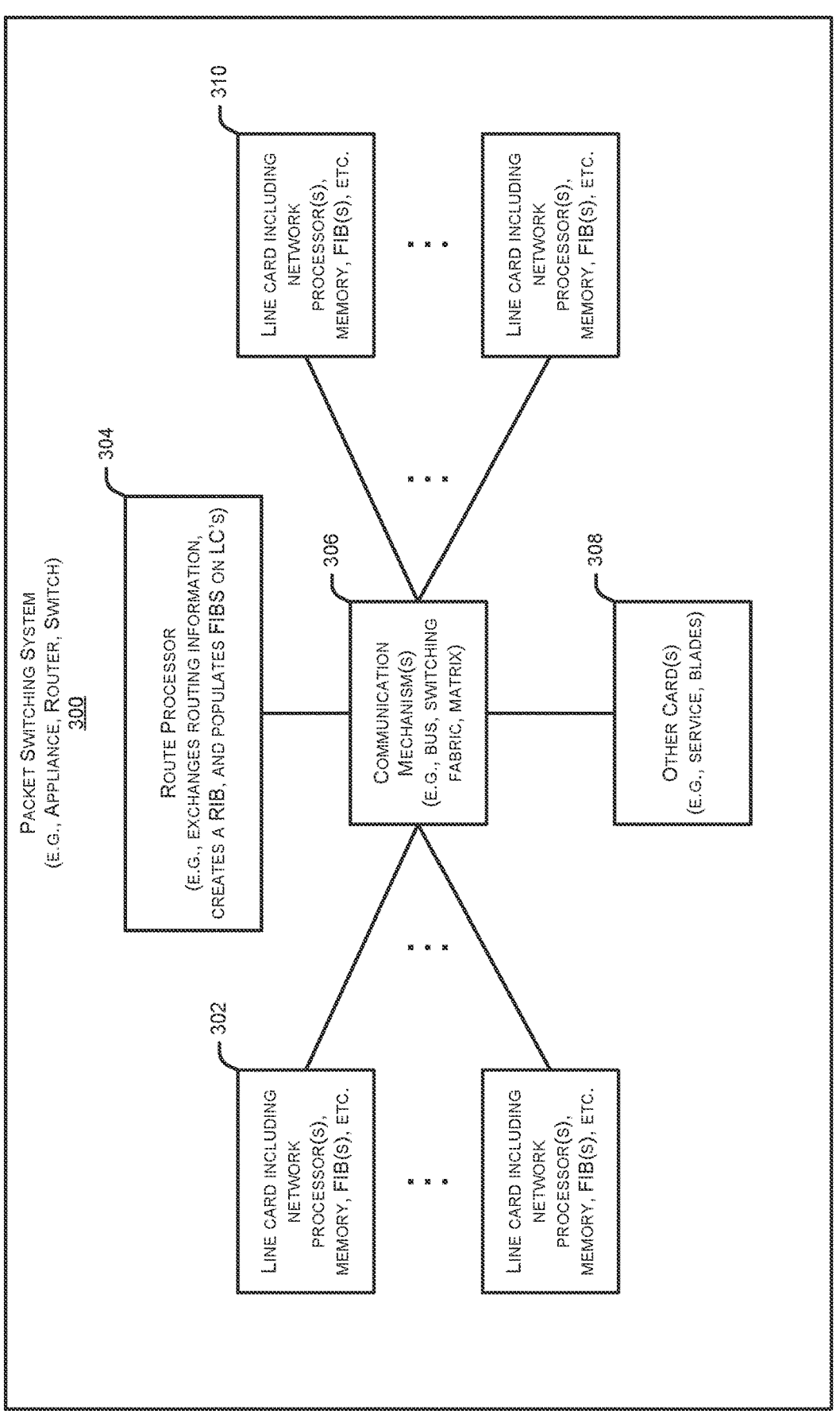
FIG. 3 illustrates a block diagram illustrating an example packet switching system that can be utilized to implement various aspects of the technologies disclosed herein.

This disclosure describes method(s) to resolve traffic asymmetry resulting from instable connection(s) between network devices and routing controllers. The method may include receiving, at a first hub node that facilitates communications between a first network and a second network, a preference order associated with a route advertised by an edge node associated with the first network. Additionally, or alternatively, the method may include determining, by the first hub node and based at least in part on the preference order, that the first hub node is a more preferred hub for the route than a second hub node that facilitates communications between the first network and the second network. Additionally, or alternatively, the method may include converting, by the first hub node, the preference order into a first metric associated with an internet protocol (IP) routing protocol that is in use in the second network. Additionally, or alternatively, the method may include distributing, by the first hub node, the route including the first metric to the second network such that the first hub node is the more preferred hub for return traffic of the route. Additionally, or alternatively, the method may include determining, by the first hub node, that a connection between the first hub node and a network controller associated with the first hub node has been lost and/or interrupted. Additionally, or alternatively, the method may include adjusting, by the first hub node and based at least in part on determining that the connection between the first hub node and the network controller has been lost, the first metric to a second metric such that that the second hub node is preferred over the first hub node for return traffic of the route. Additionally, or alternatively, the method may include distributing, by the first hub node, the route including the second metric to the second network.

The techniques described herein may be performed as a method and/or by a system having non-transitory computer-readable media storing computer-executable instructions that, when executed by one or more processors, cause the system to perform the techniques described above and herein.

Example Embodiments

As previously described, communications between a first network (e.g., a wide-area network (WAN)) and a second network (e.g., a local-area network (LAN)) may be configured to utilize an active hub and/or a standby hub, where the first network may have configured a router affinity-preference (also referred to herein as an affinity, preference, preference order, and/or the like). Network controllers may be leveraged to advertise the first network's router affinity indicating they preferred hub to the second network to allow for symmetric forwarding. However, if the active hub loses connection to the network controller, the active hub may continue to advertise routes with the same affinity (e.g., indicating the active hub as the preferred hub), causing return traffic to be forwarded asymmetrically to the original traffic. This creates problems when stateful services, like firewalls, are deployed on the hubs and results in significant traffic loss creating an outage in the network. This application describes techniques for resolving traffic asymmetry in both the wide area network (WAN) and local area network (LAN) sides of a network as a result of instable connection(s) between network devices and routing controllers. In some examples, derived router affinities may be utilized for handling a multi-hop software-defined wide area network (SD-WAN) to achieve symmetric forwarding. Additionally, or alternatively, a routing metric may be utilized for achieving symmetric routing on the LAN-side. For example, using the techniques described herein, hub nodes (or gateways, border routers, and/or the like) may be configured to translate from one information set to another information set (e.g., translate from a router affinity preference to a standardized internet routing protocol (IP) metrics) to determine symmetric routes for communicating data between disparate networks (e.g., from a LAN to WAN, and vice-versa).

In one aspect of this disclosure, the techniques may be utilized to compute protocol independent cost from affinity to provide symmetric forwarding for a multi-homed data center (DC)/Hub (active/standby). Take, for example, a network that leverages router affinity. Each branch network (e.g., endpoint) disposed on the WAN-side of the network may configure a router affinity, indicating a preferred hub node (e.g., an active hub node) and/or a fallback hub node (e.g., a standby hub node). For instance, one or more edge routers located on the WAN-side of the example network (e.g., facilitating communications between a branch network to a datacenter via the hub nodes) may be configured with an affinity preference order. For example, the edge node(s) may store an affinity preference order of "1, 2" meaning that the edge node(s) on the WAN-side will prefer the first hub node (e.g., the active hub) when forwarding traffic to the datacenter and fallback on the second hub node (e.g., the standby hub) if the first hub node is not reachable (e.g., lower affinity/preference values are automatically preferred over higher affinity values). The edge nodes may be configured to advertise a route from a given branch (or endpoint), along with the corresponding affinity preference order for the hub nodes, to a network controller (also referred to herein as a routing controller) configured to distribute the routes to the hub nodes on the LAN-side of the network. That is, a first hub node and a second hub node may be deployed in active/standby mode using the router affinity and configured to facilitate the traffic between branch routers and a datacenter. The hub nodes may be configured to learn the branch routes from the routing controller and redistribute them to the datacenter router on the LAN-side of the network. For example, the first hub node (e.g., an active hub) may be configured with an affinity/preference value "1," and a second hub node (e.g., a standby hub) may be configured with an affinity/preference value "2." The hub nodes may be configured to perform auto-translation of the affinity (using the affinity preference order from the WAN-side of the network) to a LAN-side-routing-protocol-metric ensuring that data center router(s) will prefer the active hub node over the standby hub node to talk to the branches. In other words, the hub nodes may translate the WAN-side affinity preference order to a LAN-side routing protocol metric to cause return traffic to flow via the same hub node as the forward traffic.

In another aspect of this disclosure, the techniques may be utilized to resolve traffic asymmetry resulting from instable connection(s) between network devices (e.g., hub nodes) and routing controllers. Take, for example, the network configuration described above. Consider a scenario where the active hub node (e.g., the first hub node) loses connectivity to all of the available routing controllers. In some examples, the first hub node may then enter a graceful restart (GR) with all of the routing controllers. Additionally, or alternatively, the routing controller(s) may enter a GR with the first hub node. The loss of connection to the routing controller by the active hub has various effects on both the WAN-side and the LAN-side of the network, as described in more detail below.

For instance, on the WAN-side of the network, following GR of the active hub and/or the routing controllers, the active hub node may mark all branch routes that it has learned from the routing controller as "stale," the routing controller may mark all of the datacenter routes learned from the active hub as "stale," and the routing controller may notify the branches that the datacenter routes learned via the active hub are now "stale." That is, the datacenter routes that are learned from the standby hub are still in good standing and thus they are not marked as "stale" on the routing controller or the branches. As a result, the branches now have 2 routes to reach the data center, a first "stale" route by way of the active hub, and a "non-stale" route by way of the standby hub. In some examples, the branches may prefer the "non-stale" route when calculating the routing best-path, and as a result, the branches start sending all datacenter bound traffic to the standby hub.

Additionally, or alternatively, on the LAN-side of the network, according to existing techniques, the active hub will continue to derive the LAN-side-routing-metric from the router affinity, resulting in the active hub redistributing the stale branch routes to the datacenter router with a better LAN-side-routing-metric than the standby hub and without any indication that they are stale. In such a configuration, the datacenter router will still send the return traffic from the datacenter to the branch via the active hub, leading to asymmetry in the network as the forward traffic is now using the standby hub, but return traffic is still using the active hub. Such traffic asymmetry creates problems when stateful services (e.g., firewalls) are deployed on the hub nodes and may result in significant traffic loss, creating an outage in the SD-WAN network. This traffic asymmetry is a direct result of not incorporating information about the "stale" nature of the WAN-side routes into the derivation of the LAN-side-routing-metric.

To address this traffic asymmetry problem resulting from a loss of connectivity by the active hub to the routing controller, the hub nodes may be configured to automatically manipulate the LAN-side-routing-metric on the LAN-side routes during redistribution of WAN-side routes to the LAN-side. For example, instead of merely deriving the LAN-side-routing-metric based on affinity/affinity-preference set by the branch(es), when a WAN-route that is being redistributed is determined to be "stale," the hub node may derive the LAN-side-routing-metric solely based on the "stale" state and set a worse routing metric for the LAN-side routing protocol. By configuring hub nodes (particularly the active hub node) to derive the LAN-side-routing-metrics for "stale" routes solely based on the "stale" state, the traffic asymmetry problem may be resolved automatically without any user intervention, as described in more detail below.

For instance, when the active hub node loses connectivity to all of the network controllers, the active hub may be configured to set a worse LAN-side-routing-metric when it redistributes the "stale" WAN-side routes to the LAN-side. Additionally, or alternatively, the standby hub may be configured to continue to redistribute the "non-stale" WAN-side routes to the LAN-side using the regular/normal LAN-side-routing-protocol-metric. As a result, the datacenter routers may prefer the standby hub for the return traffic when talking to the branch(es) (e.g., the route with the better LAN-side-routing-metric). It should be understood that configuring a "worse" LAN-side-routing-metric for a "stale" route may cause the associated hub to be preferred last for return traffic. That is, a first LAN-side-routing-metric associated with a "non-stale" route that received from a standby hub (having a lower router affinity) will be selected by the datacenter router for the return traffic over a second LAN-side-routing-metric associated with a "stale" route that is received from an active hub.

Additionally, or alternatively, the branches and/or edge nodes are already configured to prefer the standby hub for forwarding traffic to the datacenter, since the routes learned from the standby hub are "non-stale" and those learned from the active hub are "stale." Such a configuration causes the traffic to automatically adjust itself and preserve path symmetry, without the need for any user intervention. Additionally, or alternatively, when the active hub regains connectivity back to the network controller(s), traffic in both directions may be configured to start flowing back via the active hub automatically without any user intervention. This is due to the active hub no longer advertising the routes as "stale," and as such, the LAN-side-routing-metric is derived again based on the router affinity set by branches.

As described herein, a computing-based, network-based, cloud-based service, network device, router, and/or hub can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to resolving traffic asymmetry resulting in connection loss between an active hub and a network controller. For instance, the techniques described herein include deriving a LAN-side-routing-metric based on router affinity set by the branches, and then manipulating the LAN-side metric as a worse routing metric for "stale" routes. By overriding the traditional LAN-side-routing-metric derivation techniques in the event of a "stale" route, datacenter routers are made aware of the "stale" routes, and they will prefer the standby hub for return traffic, resolving the traffic asymmetry problem. As a result, during all disruptive events, traffic may elegantly adapt to the dynamic and/or changing network conditions and reroute itself while completely preserving path symmetry, without any network disruption and without the need for any user intervention. This reduces work on network admins and prevents networking errors that otherwise may lead to dead paths through the network, resulting in traffic loss, or even an outage in an SD-WAN network. This results in reduced computing costs and improved network stability.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-2 illustrate flow diagrams of example methods 100 and 200 that illustrate aspects of the functions performed at least partly by the WAN-side 102 and/or LAN-side 104 of a network as described in FIGS. 1A-1C. The logical operations described herein with respect to FIGS. 1 and 2 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 1 and 2, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 1A-1C collectively illustrate a system-architecture diagram of an example environment and method 100 for performing the symmetric forwarding techniques disclosed herein in an example active/standby hub architecture. The architecture includes a first network 102, a second network 104, a first hub node 106(1) (e.g., an active hub node 106(1)), a second hub node 106(N) (e.g., a standby hub node 106(N)) (referred to collectively as "hub nodes 106"), one or more datacenter router(s) 108, one or more network controllers 110, one or more edge node(s) 112, and/or one or more endpoints 114 (also referred to herein as branches). Additionally, FIG. 1A illustrates a portion of the method where the active hub 106(1) has a stable connection to the network controller(s) 110 and is the preferred hub 106 for return traffic from the datacenter router(s) 108 to the endpoint(s) 114.

In some examples, the first network 102 and the second network 104 may be disparate networks. For instance, the first network 102 may be a wide area network (WAN) and the second network 104 may be a local area network (LAN) (e.g., a LAN within a data center). In some examples, the second network 104 and/or the first network 102 may be part of a software-defined wide area network (SD-WAN).

The hub nodes 106 may facilitate communications between the second network 104 and the first network 102. In some examples, the hub nodes 106 may each have a respective preference number 116 assigned to it. For instance, the first hub node 106(1) has an assigned preference number 116(1) of "1" and the second hub node 106(2) has an assigned preference number 116(N) of "2." In some examples, a preference number 116 may be a router affinity number, an affinity group number of a router, or the like. In some examples, the hub nodes 106 may be configured as SD-WAN transport gateways.

In some examples, the edge nodes 112 may each have a respective preference order 118. For instance, the edge node 112 may have a preference order 118 of "1, 2." In some examples, a preference order 118 may be an affinity preference configuration of the edge node 112 indicating which hub node 106 to prefer when forwarding traffic toward the datacenter router(s) 108.

In examples, the hub nodes 106 may utilize aspects of the techniques described herein to determine or compute LAN-side-routing-metrics from preference orders 118 and/or the preference numbers 116 (e.g., affinity). In some examples, determining protocol independent LAN-side-routing-metrics from preference orders 118 may be used when routes are re-originated or redistributed by the hub nodes 106 to the datacenter routers 108.

Take, for example, a network that leverages router affinity. Each branch network (e.g., endpoint 114) disposed on the WAN-side 102 of the network may configure a router affinity, indicating a preferred hub node 106 (e.g., an active hub node 106(1)) and/or a fallback hub node 106 (e.g., a standby hub node 106(N)). For instance, the one or more edge nodes 112 located on the WAN-side 102 of the example network (e.g., facilitating communications between a branch network 114 to a datacenter router 108 via the hub nodes 106) may be configured with an affinity preference order 118. For example, the edge node(s) 112 may store an affinity preference order 118 of "1, 2" meaning that the edge node(s) 112 on the WAN-side 102 will prefer the first hub node 106(1) (e.g., the active hub 106(1)) when forwarding traffic to the datacenter router 108 and fallback on the second hub node 106(N) (e.g., the standby hub 106(N)) if the first hub node 106(1) is not reachable (e.g., lower affinity/preference values are automatically preferred over higher affinity values).

At "1," the edge nodes 112 may be configured to advertise a route from a given branch (or endpoint 114), along with the corresponding affinity preference order 118 for the hub nodes 106, to a network controller 110 (also referred to herein as a routing controller) configured to distribute the routes to the hub nodes 106 on the LAN-side 104 of the network. That is, a first hub node 106(1) and a second hub node 106(N) may be deployed in active/standby mode using the router affinity and configured to facilitate the traffic between branch routers 114 and a datacenter router 108.

At "2," the network controller 110 may be configured to distribute the WAN routes and the preference order 118 to the hub node(s) 106 and redistribute them to the datacenter router 108 on the LAN-side 104 of the network. Additionally, or alternatively, the hub nodes 106 may be configured to learn the branch routes from the routing controller 110 and redistribute them to the datacenter router 108 on the LAN-side 104 of the network. For example, the first hub node 106(1) (e.g., the active hub 106(1)) may be configured with an affinity/preference value "1," and a second hub node 106(N) (e.g., the standby hub 106(N)) may be configured with an affinity/preference value "2."

At "3," the hub nodes 106 may be configured to perform auto-translation of the affinity (using the affinity preference order 118 from the WAN-side 102 of the network) to a LAN-side-routing-protocol-metric ensuring that data center router(s) 108 will prefer the active hub node 106(1) over the standby hub node 106(N) to talk to the branches. In other words, the hub nodes 106 may translate the WAN-side affinity preference order 118 to a LAN-side-routing-protocol-metric to cause return traffic to flow via the same hub node 106 as the forward traffic.

At "4," the hub nodes 106 may distribute the route(s) including the first metric to the datacenter router(s) 108 disposed on the LAN-side 104 of the network.

At "5," the datacenter router(s) 108 may receive the LAN-side-routing-metric generated by the hub node(s) 106 and may determine that the first hub node 106(1) is the preferred hub node 106 for return traffic to the endpoint(s) 114.

FIG. 1B illustrates another system-architecture diagram of the example environment and method 100 for performing the symmetric forwarding techniques disclosed herein in an example active/standby hub architecture. Additionally, FIG. 1B illustrates a portion of the method where the active hub 106(1) loses connection to the network controller(s) 110.)

Take, for example, the network configuration described above with respect to FIG. 1A, where the endpoints 114 prefer the active hub node 106(1) to forward traffic to the datacenter router(s) 108 on the LAN-side 104 of the network, and the data center router(s) 108 prefer the active hub node 106(1) to return traffic to the endpoint(s) 114 on the WAN-side 102 of the network. Consider a scenario where the active hub node 106(1) (e.g., the first hub node) loses connectivity 120 to all of the available routing controllers 110.

At "6A," the first hub node 106(1) may then enter a graceful restart (GR) with all of the routing controllers 110. Additionally, or alternatively, at "6B," the routing controller(s) 110 may enter a GR with the first hub node 106(1).

At "7," following GR of the active hub 106(1) and/or the routing controllers 110, the active hub node 106(1) may mark all branch routes that it has learned from the routing controller 110 as "stale," the routing controller 110 may mark all of the datacenter routes learned from the active hub 106(1) as "stale," and the routing controller 110 may notify the edge node(s) 112 and/or the branches 114 that the datacenter routes learned via the active hub 106(1) are now "stale." That is, the datacenter routes that are learned from the standby hub 106(N) are still in good standing and thus they are not marked as "stale" on the routing controller 110 or the branches 114.

FIG. 1C illustrates another system-architecture diagram of the example environment and method 100 for performing the symmetric forwarding techniques disclosed herein in an example active/standby hub architecture. Additionally, FIG. 1C illustrates a portion of the method where the standby hub 106(N) is now configured as the preferred hub 106 for return traffic from the datacenter router(s) 108 to the endpoint(s) 114 as a result of the active hub 106(1) losing connection to the network controller(s) 110.

At "8," as a result, the branches 114 now have 2 routes to reach the datacenter router(s) 108, a first "stale" route by way of the active hub 106(1) operating in a GR, and a "non-stale" route by way of the standby hub 106(N) which still has an active connection to the routing controller(s) 110. In some examples, the branches 114 may prefer the "non-stale" route when calculating the routing best-path, and as a result, the branches 114 start sending all datacenter bound traffic to the standby hub 106(N). That is, the edge node(s) 112 and/or the endpoints 114 may update the preference order 118 to prefer the standby hub 106(N) over the active hub 106(1) (e.g., a preference order "2, 1").

At "9," the hub node(s) 106 may be configured to again perform auto-translation of the affinity (using the affinity preference order 118 from the WAN-side 102 of the network) to a LAN-side-routing-protocol-metric that may be utilized by the datacenter router(s) 108 when selecting which hub node 106 to prefer for the return traffic.

For instance, prior to auto-translating the affinity to the LAN-side-routing-protocol-metric according to the techniques described herein, the edge nodes 112 and/or endpoints 114 may be configured to forward traffic to the datacenter router(s) 108 by way of the standby hub 106(N), while the datacenter router(s) 108 still prefer the active hub 106(1) to return the traffic to the endpoint(s) 114. To address this traffic asymmetry problem resulting from a loss of connectivity 120 by the active hub 106(1) to the routing controller, the hub nodes may be configured to automatically manipulate the LAN-side-routing-metric on the LAN-side routes during redistribution of WAN-side 102 routes to the LAN-side 104 of the network. For example, instead of merely deriving the LAN-side-routing-metric based on affinity/affinity-preference set by the branch(es) 114, when a WAN-side 102 route that is being redistributed is determined to be "stale" (e.g., the hub node 106 corresponding to the route has lost connection 120 to the network controller(s) 110) the hub node 106 may derive the LAN-side-routing-metric solely based on the "stale" state and set a worse routing metric for the LAN-side routing protocol. By configuring hub nodes 106(particularly the active hub node 106) to derive the LAN-side-routing-metrics for "stale" routes solely based on the "stale" state, the traffic asymmetry problem may be resolved automatically without any user intervention, as described in more detail below.

At "10," when the active hub node 106(1) loses connectivity 120 to all of the network controllers 110, the active hub 106(1) may be configured to set a worse LAN-side-routing-metric when it redistributes the "stale" WAN-side 102 routes to the LAN-side 104 of the network. Additionally, or alternatively, the standby hub 106(N) may be configured to continue to redistribute the "non-stale" WAN-side 102 routes to the LAN-side 104 of the network using the regular/normal LAN-side-routing-protocol-metric.

At "11," the datacenter routers 108 may now prefer the standby hub 106(N) for the return traffic when talking to the branch(es) 114 (e.g., the route with the better LAN-side-routing-metric). That is, configuring a "worse" LAN-side-routing-metric for a "stale" route may cause the associated hub node 106 to be preferred last for return traffic by the datacenter router(s) 108. That is, a first LAN-side-routing-metric associated with a "non-stale" route that received from a standby hub node 106(N) (having a lower router affinity) will be selected by the datacenter router 108 for the return traffic over a second LAN-side-routing-metric associated with a "stale" route that is received from an active hub node 106(1).

Additionally, or alternatively, the branches 114 and/or edge nodes 112 are already configured to prefer the standby hub 106(N) for forwarding traffic to the datacenter router 108, since the routes learned from the standby hub 106(N) are "non-stale" and those learned from the active hub 106(1) are "stale." Such a configuration causes the traffic to automatically adjust itself and preserve path symmetry, without the need for any user intervention. Additionally, or alternatively, when the active hub node 106(1) regains connectivity back to the network controller(s) 110, traffic may be configured to start flowing via the active hub node 106(1) again, in both directions, automatically and without any user intervention. This is due to the active hub node 106(1) no longer advertising the routes as "stale," to the network controller(s) 110 and/or to the datacenter router(s) 108 and as such, the LAN-side-routing-metric may be derived again based on the router affinity set by branches 114.

FIG. 2 illustrates a flow diagram of an example method 200 for performing the symmetric forwarding techniques disclosed herein. In some examples, the method 200 may be performed by the active hub node 106(1) and/or the standby hub node 106(N) as described with respect to FIGS. 1A-C.

At 202, the method 200 may include receiving a preference order associated with a route advertised by an edge node associated with a first network. In some examples, the preference order may be received at a first hub node that facilitates communications between the first network and a second network. In some examples, the preference order, the edge node, the first network, the second network, and/or the first hub node may correspond to the preference order 118 (or the preference number 116), the edge node 112, the first network 102, the second network 104, and/or the active hub node 106(1) as described with respect to FIGS. 1A-1C.

At 204, the method 200 may include determining that the first hub node is a more preferred hub for the route than a second hub node. In some examples, the second hub node that facilitates communications between the first network and the second network. In some examples, determining that the first hub node is the more preferred hub for the route than a second hub node may be performed by the first hub node and/or based at least in part on the preference order. In some examples, the second hub node may be configured as the standby hub node 106(N), as described with respect to FIGS. 1A-1C.

At 206, the method 200 may include converting, by the first hub node, the preference order into a first metric associated with an internet protocol (IP) routing protocol that is in use in the second network. In some examples, the first metric may correspond to the LAN-side-routing-protocol-metric as described with respect to FIGS. 1A-1C.

At 208, the method 200 may include distributing, by the first hub node, the route including the first metric to the second network such that the first hub node is the more preferred hub for return traffic of the route. In some examples, the first hub node may distribute the route to a datacenter router disposed in the second network, such as, for example, the datacenter router 108 as described with respect to FIGS. 1A-1C.

At 210, the method 200 may include determining, by the first hub node, that a connection between the first hub node and a network controller associated with the first hub node has been lost. In some examples, the network controller may correspond to the network controller(s) 110 as described with respect to FIGS. 1A-1C.

At 212, the method 200 may include adjusting the first metric to a second metric such that that the second hub node is preferred over the first hub node for return traffic of the route. In some examples, the first metric may be adjusted to the second metric by the first hub node and based at least in part on determining that the connection between the first hub node and the network controller has been lost. Additionally, or alternatively, the first hub node may adjust the first metric to the second metric by considering the "stale" indication of the routes at the time of converting the preference order into a LAN-side-routing-protocol-metric, as described with respect to FIGS. 1A-1C.

At 214, the method 200 may include distributing, by the first hub node, the route including the second metric to the second network. In some examples, distributing the route and the second metric to the second network may cause a router associated with the second network to prefer the second hub node over the first hub node for the return traffic of the route.

Additionally, or alternatively, the method 200 may include storing, by the hub node, an indication that the first hub node is the more preferred hub for the route. In some examples, the indication may be stored by the first hub node as a protocol-independent cost metric in a routing information base (RIB).

Additionally, or alternatively, the method 200 may include determining, by the first hub node, that the connection between the first hub node and the network controller has been reestablished. Additionally, or alternatively, the method 200 may include adjusting, by the first hub node and based at least in part on determining that the connection between the first hub node and the network controller has been reestablished, the second metric to the first metric such that the first hub node is preferred over the second hub node for return traffic of the route. Additionally, or alternatively, the method 200 may include distributing, by the first hub node, the route including the first metric to the second network.

Additionally, or alternatively, the method 200 may include determining, by the first hub node, a preference number associated with the first hub node, wherein determining that the first hub node is the more preferred hub is further based at least in part on the preference number associated with the first hub node.

In some examples, determining that the first hub node is the more preferred hub comprises determining, by the first hub node, that the preference number associated with the first hub node ranks higher in the preference order than another preference number associated with the second hub node.

In some examples, the first network is a wide area network (WAN) and the second network is a local area network (LAN).

In some examples, the route and the preference order associated with the route is received from the network controller.

In some examples, the IP routing protocol that is in use in the second network comprises at least one of External Border Gateway Protocol (EBGP), Internal Border Gateway Protocol (IBGP), or Open Shortest Path First (OSPF).

FIG. 3 illustrates a block diagram illustrating an example packet switching device (or system) 300 that can be utilized to implement various aspects of the technologies disclosed herein. In some examples, packet switching device(s) 300 may be employed in various networks, such as, for example, the first network 102 and/or the second network 104 as described with respect to FIGS. 1A-1C.

In some examples, a packet switching device 300 may comprise multiple line card(s) 302, 310, each with one or more network interfaces for sending and receiving packets over communications links (e.g., possibly part of a link aggregation group). The packet switching device 300 may also have a control plane with one or more processing elements 304 for managing the control plane and/or control plane processing of packets associated with forwarding of packets in a network. The packet switching device 300 may also include other cards 308 (e.g., service cards, blades) which include processing elements that are used to process (e.g., forward/send, drop, manipulate, change, modify, receive, create, duplicate, apply a service) packets associated with forwarding of packets in a network. The packet switching device 300 may comprise hardware-based communication mechanism 306 (e.g., bus, switching fabric, and/or matrix, etc.) for allowing its different entities 302, 304, 308 and 310 to communicate. Line card(s) 302, 310 may typically perform the actions of being both an ingress and/or an egress line card 302, 310, in regard to multiple other particular packets and/or packet streams being received by, or sent from, packet switching device 300.

Figure 4:
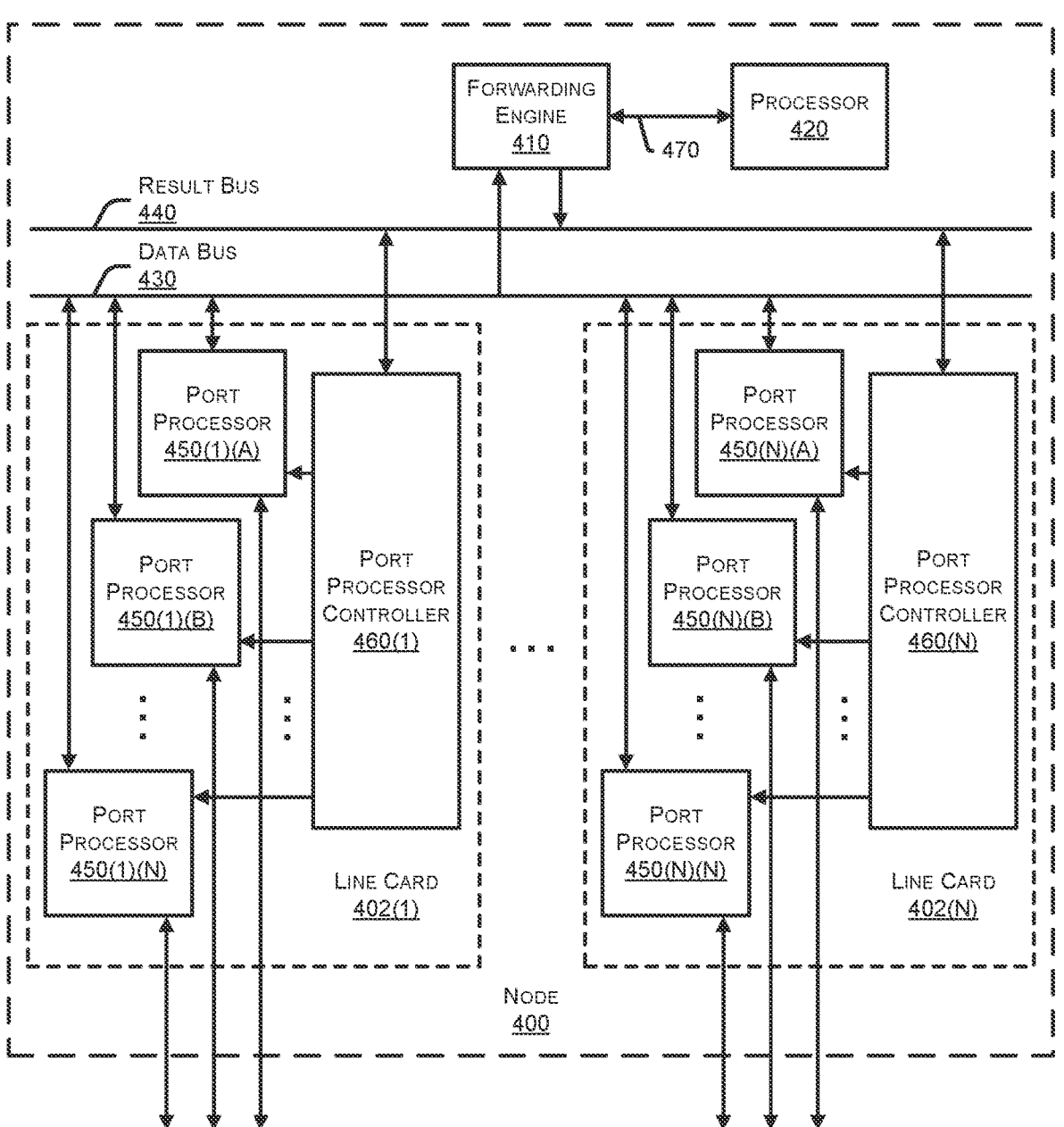
FIG. 4 illustrates a block diagram illustrating certain components of an example node that can be utilized to implement various aspects of the technologies disclosed herein.

FIG. 4 illustrates a block diagram illustrating certain components of an example node 400 that can be utilized to implement various aspects of the technologies disclosed herein. In some examples, node(s) 400 may be employed in various networks, such as, for example, the first network 102 and/or the second network 104 as described with respect to FIGS. 1A-1C.

In some examples, node 400 may include any number of line cards 402 (e.g., line cards 402(1)-(N), where N may be any integer greater than 1) that are communicatively coupled to a forwarding engine 410 (also referred to as a packet forwarder) and/or a processor 420 via a data bus 430 and/or a result bus 440. Line cards 402(1)-(N) may include any number of port processors 450(1)(A)-(N)(N) which are controlled by port processor controllers 460(1)-(N), where N may be any integer greater than 1. Additionally, or alternatively, forwarding engine 410 and/or processor 420 are not only coupled to one another via the data bus 430 and the result bus 440, but may also communicatively coupled to one another by a communications link 470.

The processors (e.g., the port processor(s) 450 and/or the port processor controller(s) 460) of each line card 402 may be mounted on a single printed circuit board. When a packet or packet and header are received, the packet or packet and header may be identified and analyzed by node 400 (also referred to herein as a router) in the following manner. Upon receipt, a packet (or some or all of its control information) or packet and header may be sent from one of port processor(s) 450(1)(A)-(N)(N) at which the packet or packet and header was received and to one or more of those devices coupled to the data bus 430 (e.g., others of the port processor(s) 450(1)(A)-(N)(N), the forwarding engine 410 and/or the processor 420). Handling of the packet or packet and header may be determined, for example, by the forwarding engine 410. For example, the forwarding engine 410 may determine that the packet or packet and header should be forwarded to one or more of port processors 450(1)(A)-(N)(N). This may be accomplished by indicating to corresponding one(s) of port processor controllers 460(1)-(N) that the copy of the packet or packet and header held in the given one(s) of port processor(s) 450(1)(A)-(N)(N) should be forwarded to the appropriate one of port processor(s) 450(1)(A)-(N)(N). Additionally, or alternatively, once a packet or packet and header has been identified for processing, the forwarding engine 410, the processor 420, and/or the like may be used to process the packet or packet and header in some manner and/or maty add packet security information in order to secure the packet. On a node 400 sourcing such a packet or packet and header, this processing may include, for example, encryption of some or all of the packet's or packet and header's information, the addition of a digital signature, and/or some other information and/or processing capable of securing the packet or packet and header. On a node 400 receiving such a processed packet or packet and header, the corresponding process may be performed to recover or validate the packet's or packet and header's information that has been secured.

Figure 5:
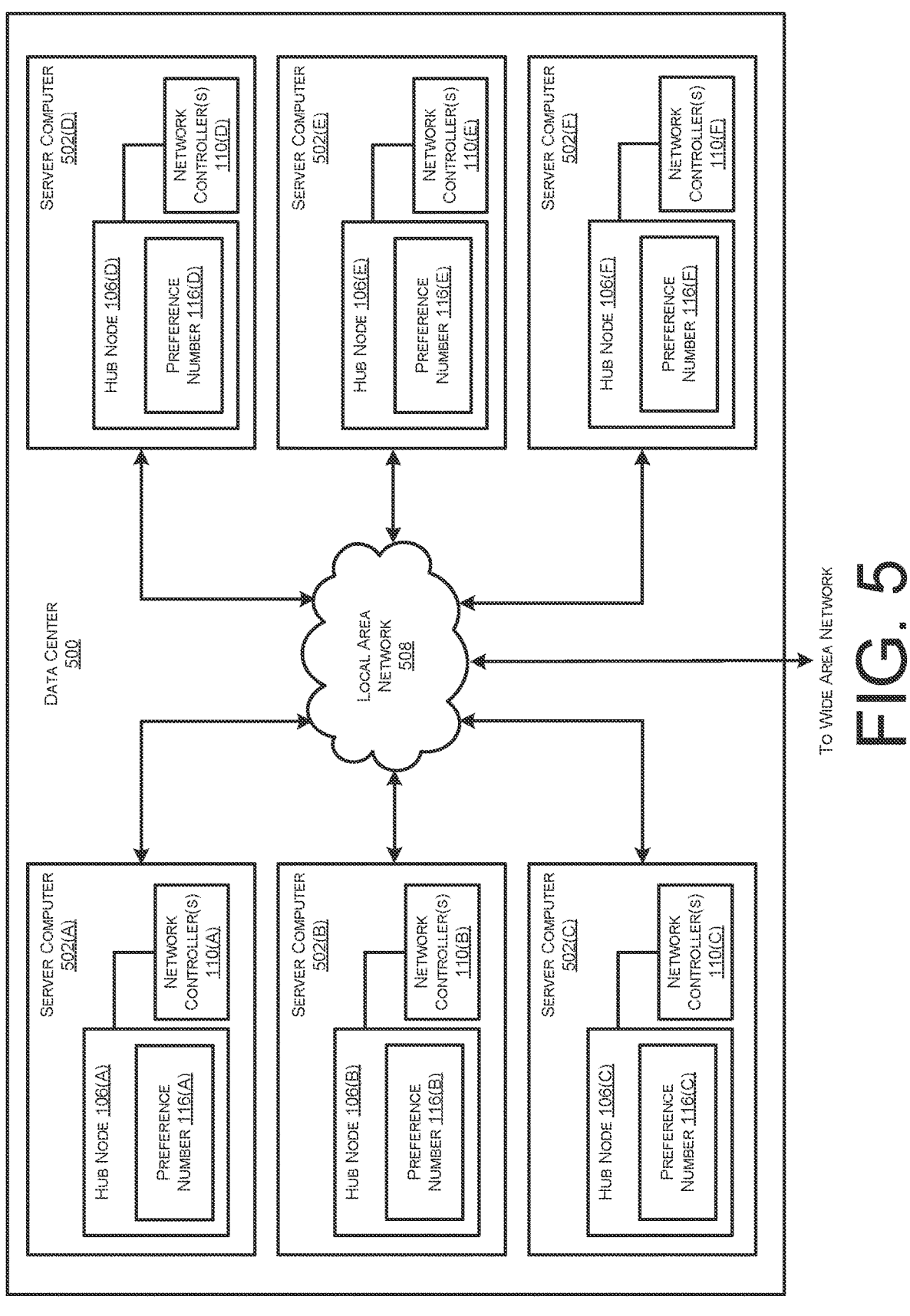
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502E (which might be referred to herein singularly as "a server computer 502" or in the plural as "the server computers 502") for providing computing resources. In some examples, the server computers 502 may include, or correspond to, servers associated with the first network 102, the second network 104, the packet switching system 300, and/or the node 400 described herein with respect to FIGS. 1A-1C, 3 and 4, respectively.

The server computers 502 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502E in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 may each execute a hub node 106 and/or one or more network controllers 110. Additionally, or alternatively, the server computers 502 may each store preference number 116 in association with the hub node 106.

In some instances, the first network 102 and/or the second network 104 may provide computing resources, like application containers, VM instances, and storage, on a permanent or an as-needed basis. Among other types of functionality, the computing resources provided by the first network 102 and/or the second network 104 may be utilized to implement the various services described above. The computing resources provided by the first network 102 and/or the second network 104 can include various types of computing resources, such as data processing resources like application containers and VM instances, data storage resources, networking resources, data communication resources, network services, and the like.

Each type of computing resource provided by the first network 102 and/or the second network 104 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The first network 102 and/or the second network 104 can also be configured to provide other types of computing resources not mentioned specifically herein.

The computing resources provided by the first network 102 and/or the second network 104 may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
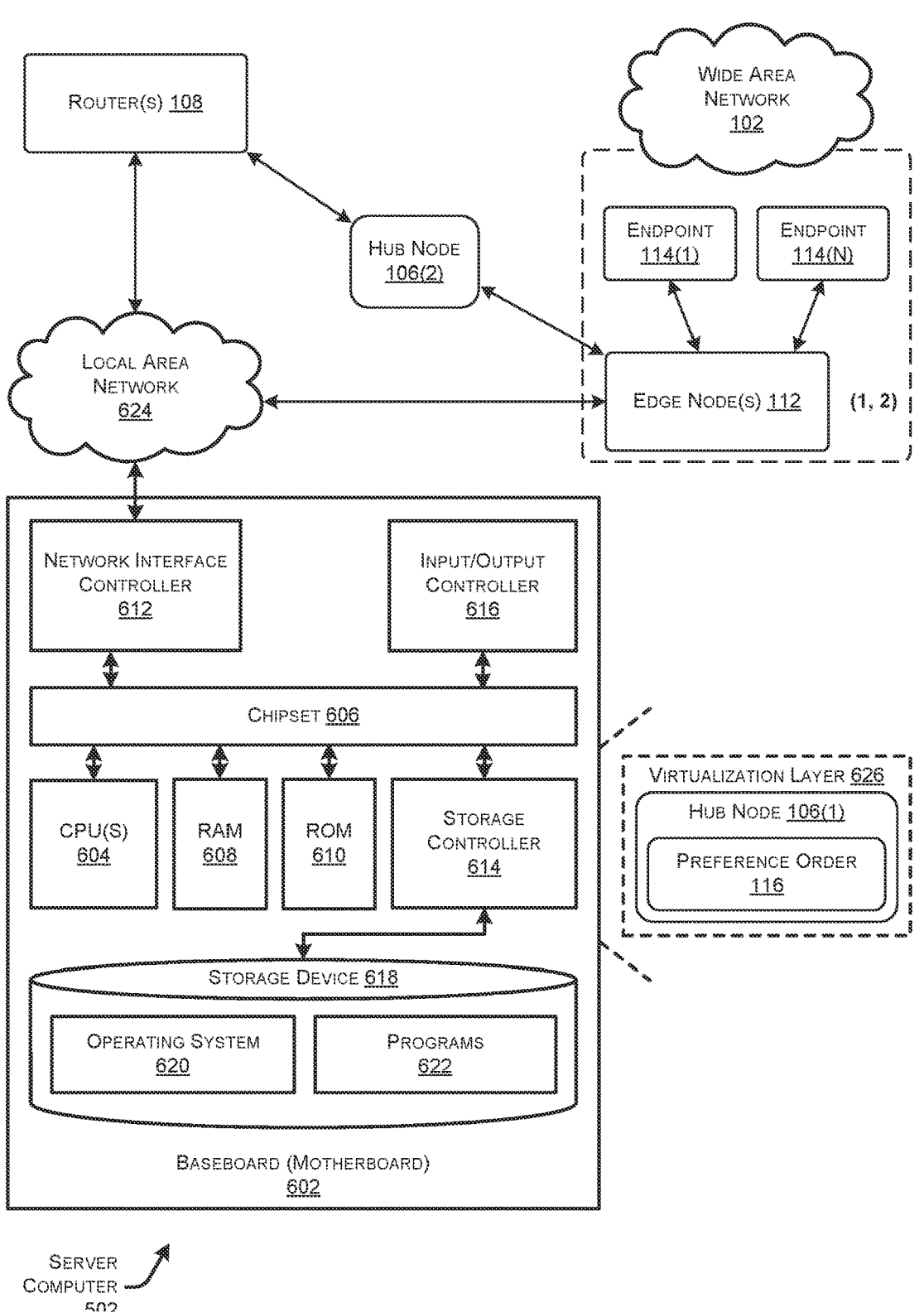
FIG. 6 is a computer architecture diagram showing an illustrative computer hardware architecture for implementing a server device that can be utilized to implement aspects of the various technologies presented herein.

FIG. 6 shows an example computer architecture for a computing device (or network routing device) 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 502 may, in some examples, correspond to a physical server associated with the first network 102 and/or the second network 104, the packet switching system 300, and/or the node 400 described herein with respect to FIGS. 1A-1C, 3, and 4, respectively.

The computing device 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 502. The chipset 606 can further provide an interface to a computer-readable storage medium such as a read-only memory ("ROM") 610 or non-volatile RAM ("NVRAM") for storing basic routines that help to startup the computing device 502 and to transfer information between the various components and devices. The ROM 610 or NVRAM can also store other software components necessary for the operation of the computing device 502 in accordance with the configurations described herein.

The computing device 502 can operate in a networked environment using logical connections to remote computing devices and computer systems through a network, such as the network 624 (or 508). The chipset 606 can include functionality for providing network connectivity through a NIC 612, such as a gigabit Ethernet adapter. The NIC 612 is capable of connecting the computing device 502 to other computing devices over the network 624. It should be appreciated that multiple NICs 612 can be present in the computing device 502, connecting the computer to other types of networks and remote computer systems.

The computing device 502 can be connected to a storage device 618 that provides non-volatile storage for the computing device 502. The storage device 618 can store an operating system 620, programs 622, and data, which have been described in greater detail herein. The storage device 618 can be connected to the computing device 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 502 can further read information from the storage device 618 by detecting the physical states or characteristics of one or more particular locations within the physical storage units.

In addition to the mass storage device 618 described above, the computing device 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 502. In some examples, the operations performed by the first network 102 and/or the second network 104, and or any components included therein, may be supported by one or more devices similar to computing device 502. Stated otherwise, some or all of the operations performed by the first network 102 and/or the second network 104, and or any components included therein, may be performed by one or more computing device 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 502.

In one embodiment, the storage device 618 or other computer-readable storage media is encoded with computer-executable instructions which, when loaded into the computing device 502, transform the computer from a general-purpose computing system into a special-purpose computer capable of implementing the embodiments described herein. These computer-executable instructions transform the computing device 502 by specifying how the CPUs 604 transition between states, as described above. According to one embodiment, the computing device 502 has access to computer-readable storage media storing computer-executable instructions which, when executed by the computing device 502, perform the various processes described above with regard to FIGS. 1A-2. The computing device 502 can also include computer-readable storage media having instructions stored thereupon for performing any of the other computer-implemented operations described herein.

The computing device 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 502 might not include all of the components shown in FIG. 6, can include other components that are not explicitly shown in FIG. 6, or might utilize an architecture completely different than that shown in FIG. 6.

The server computer 502 may support a virtualization layer 626, such as one or more components associated with the WAN 102 and/or the LAN 104, such as, for example, a hub node 106. The hub node 106 may include a preference order 116 that is used to indicate a preferred hub node for both forward and return traffic between the WAN 102 and LAN 104. The preference order 116 may be converted to a LAN-side-routing-metric. The LAN-side-routing-metric may take into account the connection status between the hub node 106 and the network controller(s) 110. That is, if the connection between a hub node 106 and the network controller(s) 110 is lost or interrupted, the hub node may set the LAN-side-routing-metric to a worse metric, such that another hub node is the preferred hub node for return traffic.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a first hub node that facilitates communications between a first network and a second network, a preference order associated with a route advertised by an edge node associated with the first network;

determining, by the first hub node and based at least in part on the preference order, that the first hub node is a more preferred hub for the route than a second hub node that facilitates communications between the first network and the second network;

converting, by the first hub node, the preference order into a first metric associated with an internet protocol (IP) routing protocol that is in use in the second network;

distributing, by the first hub node, the route including the first metric to the second network such that the first hub node is the more preferred hub for return traffic of the route;

determining, by the first hub node, that a connection between the first hub node and a network controller associated with the first hub node has been lost;

adjusting, by the first hub node and based at least in part on determining that the connection between the first hub node and the network controller has been lost, the first metric to a second metric such that that the second hub node is preferred over the first hub node for return traffic of the route; and distributing, by the first hub node, the route including the second metric to the second network.

2. The method of claim 1, further comprising storing, by the hub node, an indication that the first hub node is the more preferred hub for the route, the indication stored by the first hub node as a protocol-independent cost metric in a routing information base (RIB).

3. The method of claim 1, further comprising:

determining, by the first hub node, that the connection between the first hub node and the network controller has been reestablished;

adjusting, by the first hub node and based at least in part on determining that the connection between the first hub node and the network controller has been reestablished, the second metric to the first metric such that the first hub node is preferred over the second hub node for return traffic of the route; and distributing, by the first hub node, the route including the first metric to the second network.

4. The method of claim 1, further comprising determining, by the first hub node, a preference number associated with the first hub node, wherein determining that the first hub node is the more preferred hub is further based at least in part on the preference number associated with the first hub node.

5. The method of claim 4, wherein determining that the first hub node is the more preferred hub comprises determining, by the first hub node, that the preference number associated with the first hub node ranks higher in the preference order than another preference number associated with the second hub node.

6. The method of claim 1, wherein the first network is a wide area network (WAN) and the second network is a local area network (LAN).

7. The method of claim 1, wherein the route and the preference order associated with the route is received from the network controller.

8. A system associated with a hub node that facilitates communications between a first network and a second network, the system comprising:

one or more processors; and one or more non-transitory computer-readable media storing instructions that, when executed by the one or more processors, cause the hub node to perform operations comprising:

receiving a preference order associated with a route advertised by an edge node associated with the first network;

determining, based at least in part on the preference order, that the hub node is a more preferred hub for the route than an additional hub node that facilitates communications between the first network and the second network;

converting the preference order into a first metric associated with an internet protocol (IP) routing protocol that is in use in the second network;

distributing the route including the first metric to the second network such that the hub node is the more preferred hub for return traffic of the route;

determining that a connection between the hub node and a network controller associated with the first hub node has been lost;

adjusting, by the hub node and based at least in part on determining that the connection between the hub node and the network controller has been lost, the first metric to a second metric such that that the additional hub node is preferred over the hub node for return traffic of the route; and distributing, by the hub node, the route including the second metric to the second network.

9. The system of claim 8, the operations further comprising storing an indication that the hub node is the more preferred hub for the route, the indication stored by the hub node as a protocol-independent cost metric in a routing information base (RIB).

10. The system of claim 8, wherein the IP routing protocol that is in use in the second network comprises at least one of External Border Gateway Protocol (EBGP), Internal Border Gateway Protocol (IBGP), or Open Shortest Path First (OSPF).

11. The system of claim 8, the operations further comprising determining a preference number associated with the hub node, wherein determining that the hub node is the more preferred hub is further based at least in part on the preference number associated with the hub node.

12. The system of claim 11, wherein determining that the hub node is the more preferred hub comprises determining that the preference number associated with the hub node ranks higher in the preference order than another preference number associated with the additional hub node.

13. The system of claim 8, wherein the first network is a wide area network (WAN) and the second network is a local area network (LAN).

14. The system of claim 8, the operations further comprising:

determining, by the hub node, that the connection between the hub node and the network controller has been reestablished;

adjusting, by the hub node and based at least in part on determining that the connection between the hub node and the network controller has been reestablished, the second metric to the first metric such that the hub node is preferred over the additional hub node for return traffic of the route; and distributing, by the hub node, the route including the first metric to the second network.

15. One or more non-transitory computer-readable media storing instructions that, when executed, cause one or more processors to perform operations comprising:

receiving, at a first hub node that facilitates communications between a first network and a second network, a preference order associated with a route advertised by an edge node associated with the first network;

determining, by the first hub node and based at least in part on the preference order, that the first hub node is a more preferred hub for the route than a second hub node that facilitates communications between the first network and the second network;

converting, by the first hub node, the preference order into a first metric associated with an internet protocol (IP) routing protocol that is in use in the second network;

distributing, by the first hub node, the route including the first metric to the second network such that the first hub node is the more preferred hub for return traffic of the route;

determining, by the first hub node, that a connection between the first hub node and a network controller associated with the first hub node has been lost;

adjusting, by the first hub node and based at least in part on determining that the connection between the first hub node and the network controller has been lost, the first metric to a second metric such that that the second hub node is preferred over the first hub node for return traffic of the route; and distributing, by the first hub node, the route including the second metric to the second network.

16. The one or more non-transitory computer-readable media of claim 15, the operations further comprising storing an indication that the first hub node is the more preferred hub for the route, the indication stored as a protocol-independent cost metric in a routing information base (RIB).

17. The one or more non-transitory computer-readable media of claim 15, the operations further comprising determining a preference number associated with the first hub node, wherein determining that the first hub node is the more preferred hub is further based at least in part on the preference number associated with the first hub node.

18. The one or more non-transitory computer-readable media of claim 17, wherein determining that the first hub node is the more preferred hub comprises determining that the preference number associated with the first hub node ranks higher in the preference order than another preference number associated with the second hub node.

19. The one or more non-transitory computer-readable media of claim 17, wherein the first network is a wide area network (WAN) and the second network is a local area network (LAN).

20. The one or more non-transitory computer-readable media of claim 17, wherein the IP routing protocol that is in use in the second network comprises at least one of External Border Gateway Protocol (EBGP), Internal Border Gateway Protocol (IBGP), or Open Shortest Path First (OSPF).

* * * * *